J. B. DAVIS.
METER.
APPLICATION FILED JULY 5, 1917.
1,266,417.
Patented May 14, 1918.
2 SHEETS—SHEET 1.
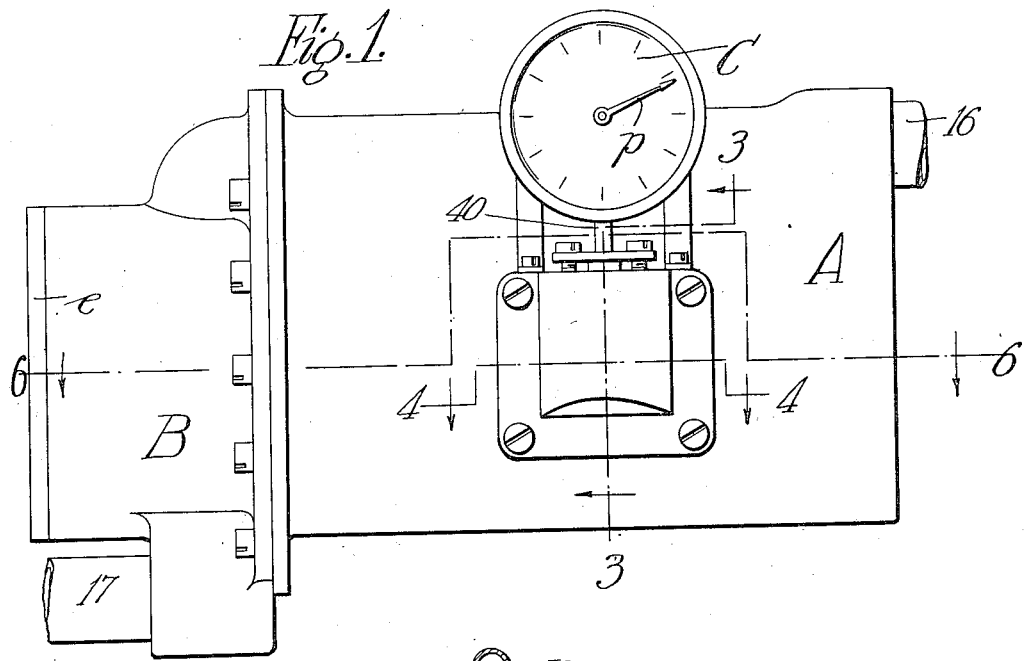
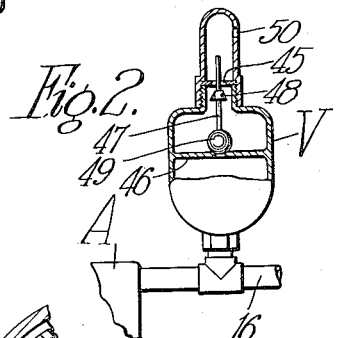
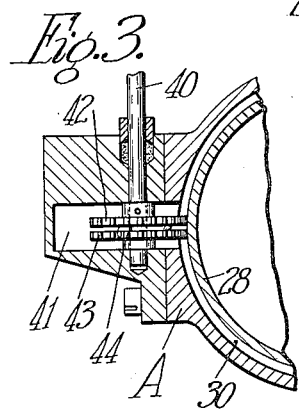
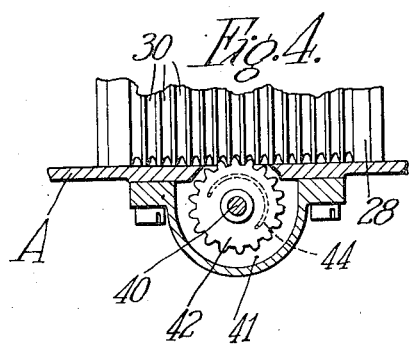
WITNESS
W. C. Ross
INVENTOR.
John B. Davis.
BY Chapin + Neal
ATTORNEYS.

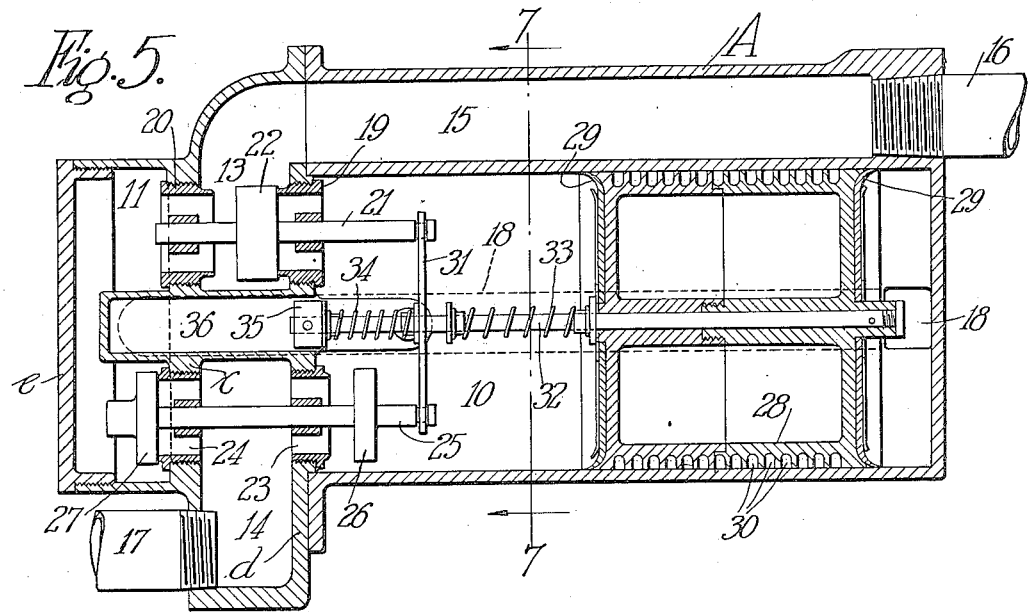
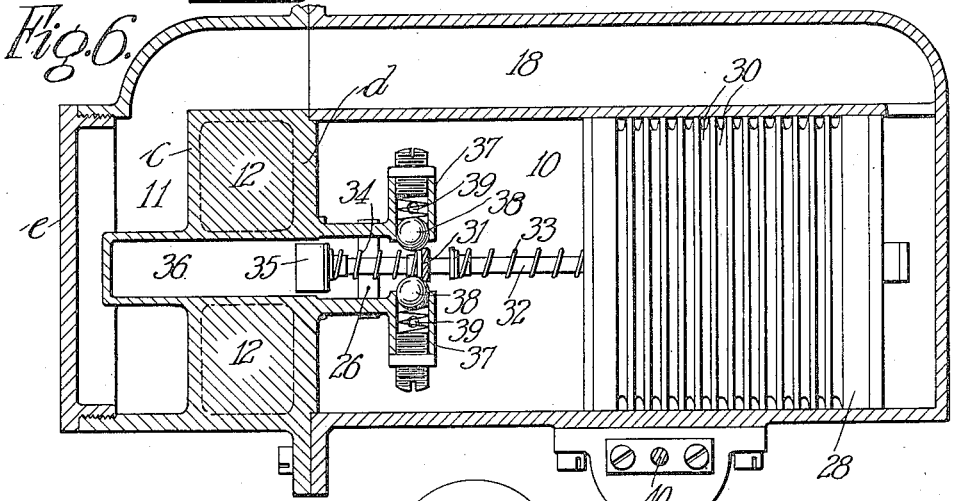
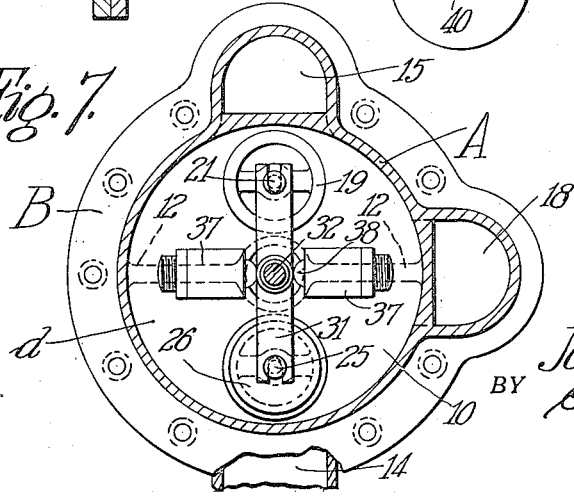

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

METER.

1,266,417.      Specification of Letters Patent.      Patented May 14, 1918.

Application filed July 5, 1917. Serial No. 178,775.

*To all whom it may concern:*

Be it known that I, JOHN B. DAVIS, a citizen of the United States of America, residing at Springfield, in the county of Hampden and State of Massachusetts, have invented certain new and useful Improvements in Meters, of which the following is a specification.

This invention relates to an apparatus for measuring liquids particularly valuable liquids such as gasolene, oils and the like. It is desirable to measure the more valuable liquids with greater accuracy than those less valuable. Furthermore it is desirable to provide not only a "fool" proof meter but also a "brain" proof meter for fear that the clever brain may be directed to the object of getting the liquid by the meter without registering its passage.

The invention is disclosed in the form of an automatically operable pipe line meter. As shown it is designed to operate from the pressure of the liquid in the line of pipe to which it is connected. Many of the features of the invention are independent of the form of the disclosure as will be apparent from the claims.

According to one feature of the invention a meter of improved accuracy is provided by arranging the parts in such a manner as to avoid all possibility of leakage and by an arrangement whereby no liquid can pass from the inlet to the outlet without traveling through the meter. The meter is characterized in that no stuffing boxes are required and the liability to leakage afforded by the use of stuffing boxes is therefore avoided. There are no operating parts, except a connection for a registering apparatus, which extend without the casing and this connection is so arranged with relation to other parts that it is never exposed to liquid and therefore does not require a stuffing box. The connection between the registering apparatus and its operating member of the meter is so made as to prevent play between the member and connection, whereby the slightest movement of the member will cause a corresponding movement of the connection.

According to another feature of the invention a meter of high accuracy is provided which requires but little power for its operation. This feature involves the use of a piston movable to and fro from the pressure of the liquid being measured with means for automatically reversing the piston travel. The piston is characterized by special light weight construction and by the provision of means to reduce the force of friction presented to movement of the piston. The construction is furthermore characterized in that the means for reversing the travel of the piston, which means involves valves automatically operated by the piston, is arranged to require but little effort on the part of the piston. The meter is thus adapted for use with low pressure systems or pipe lines in which only a relatively small head is available to cause flow.

According to another feature of the invention, the operating parts are entirely inclosed and concealed within the casing except for the connection mentioned and this connection is so arranged that it cannot be manipulated to cause the meter to register a greater or less quantity of liquid than actually passes therethrough. The meter is arranged not only for fool proof operation but for brain proof operation as well, in the sense that there are no accessible parts which can be tampered with mischievously or from curiosity and none which can be adjusted and altered by the clever brain of dishonest persons to get liquid by the meter without causing correct registration.

According to another feature of the invention, a piston is arranged to sharply operate suitable valves at the end of each stroke and means are provided, whereby the sharp sudden force required for valve operation does not require a suddenly imposed force on the piston. As distinguished from sharp, sudden shocks on the piston which cause undesirable jumps in its movement and jerky operation, the force is gradually imposed on the piston and the latter travels smoothly and in a substantially uniform manner.

Other features of the invention will appear in the illustrative embodiment of it in the accompanying drawings: in which:

Figure 1 is a front elevational view of a meter embodying the invention.

Fig. 2 is a detail view, partly in section, showing an air valve for use with the meter.

Fig. 3 is a fragmentary cross sectional view taken on the line 3—3 of Fig. 1.

Fig. 4 is a fragmentary sectional plan view taken on the line 4—4 of Fig. 1.

Fig. 5 is a sectional elevational view of the meter.

Fig. 6 is a sectional plan view thereof taken on the line 6—6 of Fig. 1; and

Fig. 7 is a cross sectional view taken on the line 7—7 of Fig. 5.

Referring to these drawings; A represents the casing of the meter, which has a hollow cylindrical chamber 10 open at one end. B represents a head, suitably secured to the casing, as indicated in Fig. 1, which head has a relatively short cylindrical chamber 11 at one end and at the other end are upper and lower substantially semi cylindrical chambers 13 and 14 respectively, the latter being separated by a lateral wall 12 (Fig. 7). The upper and lower chambers 13 and 14 are separated from chamber 11 by a partition c and from the chamber 10 by an end wall d of the head. Preferably, the other end of head B is provided with a removable cap e to permit access to chamber 11, for convenient assembly therein of parts to be later described.

The chamber 13 communicates at all times with a passage 15 which is formed in the exterior wall of casing A, as shown in Fig. 5, and is connected with an inlet pipe 16 through which the fluid to be measured is supplied. Chamber 14 is at all times connected, as shown in Fig. 5, to an outlet pipe 17 through which the fluid, after having been measured, is expelled. The chamber 11 is at all times connected to the remote end of chamber 10 by a passage 18 (Fig. 6) which is formed on the exterior wall of casing A in parallel relation with the passage 15 and, as shown in Fig. 7, is angularly spaced from the latter on the peripheral wall of casing A an angle of ninety degrees.

Referring to Fig. 5; the inlet chamber 13 is adapted to be alternately connected to chambers 10 and 11. Valve seat members 19 and 20, mounted in axial alinement in the walls d and c respectively and above partition 12, are provided with bearings to slidably support a valve stem 21. A suitable valve 22 is fixed on the latter and is movable in chamber 13 by means to be described to alternately engage the valve seats 19 and 20. The latter have suitable openings, as shown in Figs. 5 and 7, to permit fluid to pass therethrough except when valve 22 engages therewith. Similar valve seat members 23 and 24 are likewise mounted in the walls d and c respectively below partition 12 and similarly supported in these members is a valve stem 25. The seats 23 and 24 are reversely arranged from the seats 19 and 20, the seat of member 23 being within chamber 10 and that of member 24 within the chamber 11. Fixed upon stem 25 in spaced relation are valves 26 and 27 arranged respectively within chambers 10 and 11 and adapted to engage the respective valve seats therein. The valves 26 and 27 are arranged to alternately connect chambers 10 and 11 to the outlet chamber 14 and are so arranged with respect to valve 22, that chamber 10 is connected to the outlet chamber 14 at the time when chamber 11 is connected to the inlet chamber 13 and vice versa.

Slidable in chamber 10 is a piston 28, which as shown in Fig. 5 consists of a relatively long hollow shell provided at each end with a suitable packing disk 29 to prevent leakage of fluid past the piston in either direction. The piston 28 is purposely made hollow to avoid unnecessary weight, just sufficient metal being provided to obtain the requisite mechanical strength. Preferably the piston is constructed of aluminum or the like, so that its weight is still further reduced, the desired criterion being to make the piston as light as possible compatible with sufficient mechanical strength. By reducing the weight of the piston, less power is required to move it and to still further reduce the power required to move piston 28, a plurality of circumferential grooves 30 are formed in the latter as shown in Figs. 5 and 6. These grooves reduce the extent of peripheral surface of the piston, which is engageable with the walls of chamber 10, and thereby the friction presented to the movement of the piston is diminished. The grooves 30 have an additional function as will appear.

The described valve stems 21 and 25 are connected by a cross bar 31, the ends of which are forked as shown in Fig. 7 to loosely engage in suitable circumferential grooves near the ends of the valve stems. A piston rod 32 secured to piston 28 passes loosely through the cross bar 31. Loosely coiled around rod 32 and arranged between the cross bar 31 and piston 28 is a spring 33 and a similar spring 34 is likewise arranged between the cross bar and a collar 35 fixed on the left hand end of the piston rod. The end of the latter is movable, as shown in Figs. 5 and 6, in a closed cylindrical extension of chamber 10, the collar 35 being purposely made smaller than the bore of the extension to avoid a "dash-pot" action, which would oppose the movement of the piston.

Referring to Figs. 6 and 7, on opposite sides of piston rod 32 and spaced therefrom are axially alined hollow cylindrical extensions 37, which are supported from the described end wall d of the head B. The members 37 are arranged with their axes at right angles to the cross bar 31 as best shown in Fig. 7. Slidable in each member 37 is a spring pressed ball 38, which is adapted to engage the cross bar as shown in Fig. 6. Small holes 39, are formed in the members 37 beyond the travel of balls 38 to permit escape of air, whereby the balls may slide freely since the possibility of a dash pot action of the balls within the hollow cylinders is prevented.

The balls 38 function to hold the cross bar 31 in either of two positions. As illustrated, the cross bar is positioned so that valve 27 is in closed position and valve 22 engages the seat 19. The bar 31 may be moved to the left, as viewed in Fig. 6, so that its other side face will be engaged by the balls and so that it is prevented from movement to the right. In such position valve 27 will be in open and valve 26 in closed position, and valve 22 will engage seat 20. Each of the described valves when seated is exposed to fluid pressure on both sides, and the pressure on opposite sides of each valve is generally not greatly different. The force of fluid pressure on each valve, which force is equal to the difference in the pressures acting on opposite sides of each valve, is, however, directed in such a way that each valve tends of itself to remain in the position to which it has been moved. Thus, with the parts positioned as in Fig. 5, the difference in pressure between that obtaining in chambers 13 and 11 and that in chamber 14 and the left hand portion of chamber 10, acts on both valve stems 21 and 25 in the same direction and tends to hold valves 22 and 27 to seats 19 and 24, respectively, and valve 26 in open position.

The bar 31 is movable from one position to another at the end of the travel of the piston to suddenly and simultaneously actuate both valve stems. The bar 31 is held by the balls 38 until the piston 28 has reached a predetermined position, and the springs 33 and 34, although utilized to quickly move the valves, do not have sufficient force, even when entirely compressed with successive coils in abutment, to move the bar past balls 38. The release of the bar 31 is effected by a direct push of the piston, after the coils of one of the springs have been moved into abutment, and the importance of this arrangement consists in the ability to predetermine the exact point in the stroke of the piston when the bar 31 will be released, which could not readily be done if the release was effected by the force of a compressed spring. The springs are provided merely to give the sharp sudden kick to the cross bar after the latter has been released, and they function to close the valves practically instantaneously after the piston has reached the desired predetermined point in its travel.

It is important to note that, although the movement of bar 31 occurs suddenly at the end of the stroke of the piston, the force which accomplishes this movement is gradually built up to the requisite value. As distinguished from a sudden amount of work imposed on the piston near the end of its travel, the work is distributed throughout its travel with the result that there are no sudden jumps in the movement of the piston but, on the contrary, a smooth and substantially uniform movement, which is most desirable in a meter of this character, is obtained.

It will be seen from the foregoing that the piston is automatically reversed by the valves described and so long as fluid is supplied to pipe 16 the piston will reciprocate continuously. Each stroke of piston 28 displaces a definite predetermined quantity of fluid into chamber 14, and the quantity delivered to the latter at each stroke may be made, by properly proportioning of the stroke of the piston and diameter of chamber 10, any desired unit quantity, such as the gallon, for example, or any multiple or sub-multiple thereof.

In order to indicate the number of unit quantities delivered to chamber 14 a suitable registering apparatus is provided, which is indicated in conventional form at C in Fig. 1. The registering apparatus is operated from a shaft 40 by suitable mechanism not shown. Shaft 40 is mounted in casing A, as shown in Fig. 3, and extends across a chamber 41, which opens into the chamber 10. It is particularly to be noted, however, that the piston 28 is made long enough and its stroke short enough so that there is a certain portion of chamber 10 which is never exposed to fluid, and this unexposed portion is of sufficient length to overlap the opening from chamber 41 into chamber 10, so that fluid cannot enter the former chamber. Fixed to shaft 40 is a gear 42 and loose upon the shaft is a gear 43 which is connected to gear 42 by a spring 44. Both gears mesh in the grooves 30 of cylinder 28, these grooves therefore having the function of a rack as well as that function heretofore set forth. The spring 44 tends to rotate the gear 43 relatively to gear 42 as far as is permitted by the grooves 30. The result is that one tooth face of one gear engages one edge of a groove 30 while the opposite edge of the latter is engaged by the opposite face of the corresponding tooth in the other gear. Thus, "backlash" is prevented whereby the desired criterion, which is to immediately turn shaft 40 on the slightest movement of piston 28, is obtained.

Shaft 40 will be turned in opposite directions on successive strokes of piston 28. The pointer $p$ of the registering mechanism C should, therefore, be arranged to continuously turn in one direction by suitable mechanism actuated from the shaft 40 irrespective of the direction of rotation of the latter. Mechanisms to accomplish this function are well known in the art and accordingly illustration and description of such a mechanism is thought unnecessary to an understanding of the invention for the invention is independent of the particular type of registering apparatus employed.

Referring to Fig. 2, a valve casing V is connected as a branch to inlet pipe 16. Within the casing are upper and lower partitions 45 and 46 having alined openings therethrough. A slidable stem 47 has fixed thereon in spaced relation a valve 48 and a ball valve 49 which are adapted to engage the openings in partitions 45 and 46, respectively, and are also so arranged that, when either is in closed position, the other is in open position. A port 50, opening to the atmosphere, is provided in the valve casing above partition 45. Valve V is adapted to permit the escape of air from pipe 16 without permitting the escape of liquid. Air in the pipe 16 will lift valve 49 slightly and pass above partitions 46 and 45 and out through port 50, but, when liquid fills the valve casing, valve 49 is lifted, and the space between partitions 45 and 46 becomes filled with liquid, the pressure of which forces valve 48 against its seat.

The operation of the meter will now be described. The casing A is inserted in a pipe line so that all liquid from the pumping means must pass therethrough in order to reach the delivery point. With the parts positioned as in Fig. 5, liquid from pipe 16 passes through passage 15, and into chamber 13. From the latter, it passes into chamber 11, and thence through passage 18 to the right hand end of chamber 10. Piston 28 is thereby moved to the left and, as it moves, shaft 40 is rotated to turn pointer p to give an appropriate indication. As the piston travels toward the left, liquid on the left hand side thereof is forced through valve seat member 23 into the discharge chamber. As piston 28 reaches the extreme of its travel to the left, spring 33, an end of which has previously been moved into engagement with cross bar 31, is compressed until its coils abut and thereafter the balls 38 are lifted by direct push from the piston. Immediately as the balls are lifted, the compressed spring 33 sharply moves bar 31 to the left, and the balls 38 immediately move back to engage the opposite face of bar 31 and hold the latter in such a position that valve 22 seats on member 20, and valve 26 is in closed while valve 27 is in open position. Liquid then enters through member 19 into the left hand end of chamber 10, whereby piston 28 is forced to the right to turn shaft 40 in a reverse direction but nevertheless moving pointer p in the same direction as before, as already described. Liquid previously drawn into the right hand end of chamber 10 is now expelled through passage 18 into chamber 11 and thence through the open member 24 into the discharge chamber 14. At the end of its travel to the right, spring 34 is compressed and bar 31 is released in a similar manner to that described in connection with spring 33, to move cross bar 31 into the illustrated position, after which the described operations are again repeated.

It is important to note that no operating parts extend without the casing and consequently all parts, which might be mischievously interfered with or ingeniously altered to cause inaccurate registration, are inaccessible alike to the fool or to the clever crook. The shaft 40, it is true, is accessible, but, unless this shaft turns, no liquid can be obtained. The shaft might be locked but to no useful end since the flow through the meter would be stopped. The shaft cannot readily be made to turn faster or slower than its intended speed. The meter furthermore will operate under small heads for the pressure required for its operation has been reduced to a minimum by the use of a specially constructed light weight piston with means thereon to reduce friction and also by the use of the valve arrangement and releasable holding means, both of which require little effort for their actuation. The meter is simple in structure and requires practically no attention. It has, moreover, desirable characteristics on the score of accuracy in measurement. No stuffing boxes whatever are required, and with the elimination of the stuffing box a substantial stride in the progress toward accurate measurement is obtained, since stuffing boxes, as is well known, are prone to leak. Moreover, the constant attention necessary to keep stuffing boxes in properly adjusted condition is eliminated. The arrangement of a piston, the stroke of which is short enough in comparison with its length to allow a certain portion of the cylinder never to be exposed to liquid, is thought to be important in apparatus of this character, for it permits an opening through the cylinder wall for connection with the shaft of the registering mechanism with practically no possibility of leakage. A further advantageous feature of the invention is the arrangement, whereby the force necessary to suddenly operate the valves at the end of the stroke of the piston is imposed gradually upon the latter, which prevents sudden shocks on the piston and the resultant jumps and jerky operation and which makes for particularly smooth, quiet, and substantially uniform movement of the piston.

The invention has been described herein for illustrative purposes, but the scope of the invention is defined by the appended claims rather than by the foregoing description.

What I claim is—

1. A meter, comprising, a casing formed with a cylinder, a piston reciprocable therein, automatic means entirely within the casing and controlled by movement of the piston to direct fluid to and from each end of the cylinder to reciprocate the piston, and means operable by movement of the latter to indicate at all times the quantities displaced from the cylinder.

2. A meter, comprising, a cylinder, a piston reciprocable therein, automatic means to direct fluid to and from each end of the cylinder, said means arranged to coöperate alternately to reciprocate the piston, an opening formed in the cylinder intermediate its ends, said piston being of sufficient length and having a sufficiently short stroke so that the opening is overlapped at all times by the piston, whereby fluid is prevented from entering the opening, and means engageable with the piston through said opening to indicate the quantities of fluid displaced from the cylinder.

3. A meter, comprising, a casing formed with a cylinder, a piston reciprocable therein, automatic means entirely within the casing and controlled by movement of the piston to direct fluid to and from each end of the cylinder to reciprocate the piston, and means operable by movement of the piston and at a speed directly proportionate thereto to indicate at all times the quantities displaced from the cylinder.

4. A meter, comprising, a cylinder, a hollow piston slidable therein, a valve mechanism to alternately admit fluid to opposite ends of the cylinder, a valve mechanism to alternately permit discharge of fluid from opposite ends of said cylinders, said valves being arranged for coöperation alternately to reciprocate the piston and arranged so that each tends to remain in its moved position by the fluid pressure thereon, and means operable by the piston at the end of each stroke to suddenly operate said valves, all constructed and arranged for operation with low pressure pipe line systems.

5. A meter, comprising, a cylinder, a hollow piston slidable therein, a plurality of recesses in the peripheral surface of said piston to reduce its frictional engagement with said cylinder, a valve mechanism to alternately admit fluid to opposite ends of the cylinder, a valve mechanism to alternately permit discharge of fluid from opposite ends of said cylinder, said valves being arranged for coöperation alternately to reciprocate the piston, and means operable by the piston at the end of each stroke to suddenly operate said valves, all constructed and arranged for operation with low pressure pipe line systems.

6. A meter, comprising, a cylinder, a piston slidable therein and having a plurality of axially spaced circumferential grooves in its outer periphery, automatic means to direct fluid to and from each end of the cylinder to reciprocate the piston, an opening in the cylinder intermediate its ends arranged to be at all times overlapped by the piston, a shaft adapted for connection to registering apparatus and a gear on the shaft having teeth in mesh with said grooves, all constructed and arranged so that said grooves act as a rack to rotate said gear on reciprocation of the piston and so that the frictional engagement of the piston with the walls of the cylinder is effectively diminished.

7. A meter, comprising, a cylinder, a piston slidable therein, automatic means to direct fluid to and from each end of the cylinder to reciprocate the piston, an opening in the cylinder intermediate its ends arranged to be at all times overlapped by the piston, a shaft adapted for connection to registering apparatus, and means connecting the shaft and piston to rotate the former by the reciprocation of the latter without lost motion in the connecting means.

8. A meter, comprising, a cylinder, a piston slidable therein and having a plurality of axially spaced circumferential grooves in its outer periphery, automatic means to direct fluid to and from each end of the cylinder to reciprocate the piston, an opening in the cylinder intermediate its ends arranged to be at all times overlapped by the piston, a shaft adapted for connection to registering apparatus, a gear fixed on said shaft, and a gear loose on the latter, means connecting the gears tending to turn one with relation to the other, both of said gears having teeth in mesh with said grooves, whereby the shaft may be rotated by the reciprocation of the piston without lost motion.

9. A meter, comprising, a casing having an inlet and an outlet for fluid to be measured, and a cylinder, a piston slidable in the cylinder, mechanism to connect one end of the cylinder to the inlet and the other end to the outlet, said mechanism being movable to connect the first-named end to said outlet and the last-named end to said inlet, and resilient means to suddenly move said mechanism, said means being gradually compressed by the movement of the piston and arranged to sharply operate said mechanism at the end of the stroke of the piston, said casing including a removable portion entirely at one end thereof and within which the entire valve mechanism is mounted for convenient access.

10. A meter, comprising, a casing having a cylinder and an inlet and outlet for fluid, a piston slidable in the cylinder, a valve mechanism to alternately connect the inlet to opposite ends of the cylinder, a valve mechanism to alternately connect opposite ends of the cylinder to said outlet, means connecting said mechanisms for simultaneous operation arranged so that fluid is admitted to one end while it is discharged from the other end of the cylinder, resilient devices compressible by the piston at the end of each stroke to suddenly move said means, and a single set of releasable devices operable in opposition on said means to hold the latter in either of its positions until said resilient devices have been compressed to the desired degree.

11. A meter, comprising, a casing having a cylinder and an inlet and outlet for fluid, a piston slidable in the cylinder, a valve mechanism to alternately connect the inlet to opposite ends of the cylinder, a valve mechanism to alternately connect opposite ends of the cylinder to said outlet, a bar connecting said mechanisms for simultaneous operation arranged so that fluid is admitted to one end while it is discharged from the other end of the cylinder, a piston rod loosely passing through said bar, a spring on said rod on each side of the bar, said springs arranged to be alternately compressed by movement of the piston, and releasable devices to hold said bar in one position until the piston has reached a predetermined point in its travel, said springs arranged to suddenly actuate said mechanisms when the bar is released, at the end of each stroke of the piston.

12. A meter, comprising, a casing having a cylinder and an inlet and outlet for fluid, a piston slidable in the cylinder, a valve mechanism to alternately connect the inlet to opposite ends of the cylinder, a valve mechanism to alternately connect opposite ends of the cylinder to said outlet, a bar connecting said mechanisms for simultaneous operation arranged so that fluid is admitted to one end while it is discharged from the other end of the cylinder, a piston rod loosely passing through said bar, a spring on said rod on each side of the bar, said springs arranged to be alternately compressed by movement of the piston, and slidable members spring pressed into engagement with opposite edges of said bar and adapted to hold the latter in either of its positions during the compression of either of said springs, the latter arranged to suddenly move said bar when released.

13. A meter, comprising, a casing having a cylinder and an inlet and outlet for fluid, a piston slidable in the cylinder, a valve mechanism to alternately connect the inlet to opposite ends of the cylinder, a valve mechanism to alternately connect opposite ends of the cylinder to said outlet, a bar connecting said mechanisms for simultaneous operation arranged so that fluid is admitted to one end while it is discharged from the other end of the cylinder, a piston rod loosely passing through said bar, a spring on said rod on each side of the bar, said springs arranged to be alternately compressed by movement of the piston, and slidable members spring pressed into engagement with opposite edges of said bar and adapted to hold the latter in one position until the piston has reached a predetermined point in its travel, said bar when released being movable to another position by the compressed spring, said casing being provided with cylinders within which said members are slidable and openings formed in the cylinders beyond the travel of the members, whereby the latter may be moved in their cylinders without compressing the air therein.

JOHN B. DAVIS.